United States Patent Office 3,450,676
Patented June 17, 1969

3,450,676
POLYMERIZATION OF ISOCYANATES WITH ETHYLENE IMINE CATALYSTS
Gerhard Grogler and Erwin Windemuth, Leverkusen, Germany, assignors to Farbenfabriken Bayer Aktiengesellschaft, Leverkusen, Germany, a corporation of Germany
No Drawing. Filed Nov. 4, 1966, Ser. No. 591,988
Claims priority, application Germany, Nov. 11, 1965, F 47,642
Int. Cl. C08g 22/02
U.S. Cl. 260—77.5
6 Claims

ABSTRACT OF THE DISCLOSURE

A method of polymerizing an isocyanate by mixing at a temperature of from 0 to 50° C. an organic polyisocyanate having aliphatically connected —NCO groups which are separated from each other by at least five carbon atoms with from about 1 to about 10% by weight based on the weight of the organic polyisocyanate of an ethylene imine having the formula

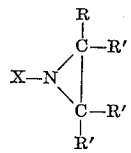

wherein X is an organic radical and R' is selected from the group consisting of hydrogen, alkyl radicals, and aryl radicals.

---

The present invention relates to the polymerization of polyisocyanates, particularly polyisocyanates having aliphatic isocyanate groups.

In the past, dimeric and trimeric isocyanates have been prepared from the polymerization of aromatic isocyanates in the presence of basic catalysts. In the dimerization of isocyanates, uretdione rings are formed from two NCO groups, while in the trimerization, isocyanurate structures are formed from three NCO groups. Also, higher molecular weight polymers having dimeric or trimeric structures can be obtained by repeated dimerization or trimerization of aromatic polyvalent isocyanates.

Heretofore, dimeric aliphatic isocyanates were unknown. On the other hand, trimeric aliphatic mono- and polyvalent isocyanates were known, but until recently, they were prepared with extreme difficulty with catalytic mixtures of tertiary amines and carbamic acid esters at temperatures above 150°. (German patent specification 1,013,869). According to British patent specification 809,809, polyvalent aliphatic isocyanates were converted into the corresponding isocyanurates with a lead-2-ethyl hexoate catalyst at reaction temperatures above 60° C.

Only recently has it been proposed to trimerize aliphatic polyisocyanates with trimerization catalysts, such as, tertiary phosphines, arsines or stibenes or arsenious oxides or antimonous oxides at temperatures of from 50 to 60°. Obviously, these catalysts may be used in the trimerization of aliphatic diisocyanates, since isocyanurate formation takes place under mild reaction conditions. From the infra-red spectrum and the physico-chemical properties, it is assumed that aliphatic isocyanurates are formed exclusively. Also, it is known that aliphatic diisocyanates may be trimerized with ethylene imines at reaction temperatures of about 150°.

Furthermore, the linear polymerization of aliphatic diisocyanates of the general formula $$OCN—(CH_2)_n—NCO$$

wherein $n$ is an integer of from 1 to 4 at reaction temperatures of —50 to 100° in the presence of anionic catalysts in polar solvents is likewise known. However, this process produces soluble but non-meltable polymers having the following recurring groups:

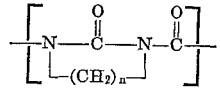

It has been stated in the art heretofore that ethylene imines, although powerful NCO/OH catalysts, are not useful for the polymerization of —NCO groups.

It is therefore an object of this invention to provide improved polymeric isocyanates. Another object of this invention is to provide an improved method for polymerizing isocyanates. Still another object of this invention is to provide an improved catalyst for the preparation of polymeric isocyanates. A further object of this invention is to provide an improved method for preparing polymeric isocyanates containing aliphatically bound —NCO groups. A still further object of this invention is to provide an improved method for preparing polymeric isocyanates from diisocyanates having aliphatically bound —NCO groups. Still a further object of this invention is to provide an improved method of catalytically polymerizing diisocyanates having aliphatically bound —NCO groups.

The foregoing objects and others, which will become apparent from the following description, are accomplished in accordance with the invention, generally speaking, by providing a method for catalyzing the polymerization of isocyanates of the formula $$OCN—R—NCO$$

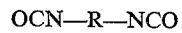

wherein R is an organic group having aliphatic groups connected to the NCO groups separated from each other with at least five carbon atoms, in the presence of a compound containing at least one ethylene imine ring of the formula

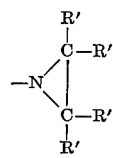

in which the R's which may be the same or different represent hydrogen atoms, alkyl or aryl groups and in which two R's, one from each of the adjacent carbon atoms, can be linked together to form a ring at temperatures of from about 0 to about 50° C. It is possible for the ethylene imine ring to be attached to numerous and widely different organic radicals which could be represented by X in the following formula. Thus the catalytic compound containing an ethylene imine may be represented as follows:

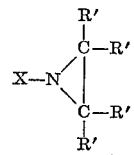

wherein the R's have the same meaning as described above and X is an organic radical. It is preferred that X be an organic radical of various types, especially $$R_1=N—CH_2—CH_2—$$

or $R_2$—NH—CO— wherein $R_1$ is a divalent hydrocarbon radical obtained by removing the carbonyl group from an aldehyde or ketone and $R_2$ is obtained by removing the —NCO group from a monoisocyanate as more particularly set forth below.

Thus a large number of polymerization catalysts can be used in accordance with the invention. N-alkyl-, N- alkylaryl- and N-aryl-ethylene imines are suitable, it being possible for the hydrocarbon radicals to be linear or branched, saturated or unsaturated or even substituted and to contain hetero atoms, as for example, N-methyl ethylene imine, N-ethyl ethylene imine, N-vinyl ethylene imine, N-butenyl ethylene imine, N-phenyl-ethylene imine, N-(beta-phenylethyl)-1,2-propylene imine, N- benzyl ethylene imine, N-beta-phenylethyl ethylene imine, ethylene imino acetic acid methyl ester, beta-ethylene imino propionic acid methyl and ethyl esters, beta-ethylene imino butyric acid methyl ester, beta-ethylene imino succinic acid diethyl ester, bis-beta-ethylene imino butyric acid ethyl ester, beta-ethylene imino propionitrile, N-beta-cyanethyl-2,2-dimethyl ethylene imine, beta-ethylene imino ethyl methylketone, 3-N-ethylene imino cyclopentanone, beta, beta'-diethylene imino diethyl sulphide, beta, beta'-diethylene imino diethyl sulphone, N-(beta-ethylene imino ethyl)-piperidine, Schiff's bases obtainable from aromatic aldehydes and ketones and ethylene imines of the type

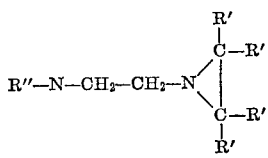

in which the R's have the meaning indicated above and R'' represents the hydrocarbon radical belonging to the aldehyde or ketone.

The ethylene imines which also contain a tertiary nitrogen atom in the molecule, e.g., ethylene imino-N-methylene piperidine, are excellent catalysts.

Ethylene imines, such as N-acyl ethylene imines are suitable catalysts. Examples of N-acyl ethylene imines are acetyl ethylene imine, the diethylene imide of the carbonic acid of diethylene urea, N-benzoyl ethylene imide, methane-sulphonic acid ethylene imide, propane-1,3-disulpho-di-N,N-ethylene imide, benzene sulpho or toluene sulpho ethylene imides, phosphoric acid triethylene imide, phosphoric acid ethyl ester diethylene imide, phosphoric acid diethylamide diethylene imide, N,N-ethylene ethyl urethane or N,N-ethylene allyl urethane.

Also, N,N-ethylene urea derivatives have proven to be suitable as catalysts. Examples of N,N-ethylene urea derivatives are ethylene urea, monosubstituted N,N-ethylene ureas which are obtained from isocyanates and ethylene imines and are represented by the formula

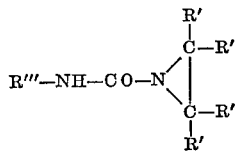

where R' has the meaning indicated above and R''' represents the molecule component associated with the isocyanate. Examples of these compounds are methyl-N,N-ethylene urea, phenyl-N,N-ethylene urea, phenyl-N,N-2-methyl ethylene urea, cyclohexyl ethylene urea, hexamethylene-1,6-di-(N,N-ethylene urea), octamethylene-1,8-di-(N,N-ethylene urea) diphenyl-methane-4,4'-di-(N,N-ethylene urea or tolulene-2,4-di-(N,N-ethylene urea).

These ureas indicated by way of example can be formed beforehand and added to the isocyanate to be polymerized, or they are formed in situ with ethylene imines in the isocyanate provided for the polymerization. Ethylene imines suitable for this purpose are, for example, ethylene imine, 2-methylethylene imine, 2-ethyl ethylene imine, 2,2-dimethyl ethylene imine, 2,3-dimethyl ethylene imine, 1,2-amino cyclohexane, 2-phenyl ethylene imine and the like.

Likewise suitable for use as a catalyst are disubstituted N,N-ethylene urea derivatives, such as, N,N-dimethyl-, N,N-diethyl-, N,N-di-n-butyl-, N,N-dialkyl-N',N'-ethyl- ene ureas, tetramethylene ethylene urea, pentamethylene ethylene urea, hexamethylene ethylene urea and piperazinodicarbamic acid diethylene imide.

Also, those compounds which contain the ethylene imine ring and which also contain one or several groups which are reactive with respect to the isocyanate groups may be used as catalysts for the polymerization of isocyanates. Examples of these compounds are 2-hydroxy-1-ethylene imino ethane, 2-methyl-2-hydroxy-1-ethylene imino butane, 2-phenyl-2-hydroxy-1-ethylene imino ethane, 1- phenyl-2-hydroxy-1-ethylene imino propane, 3-amino-1 ethylene imino propane, 3-hydroxy-1-ethylene imino propane, beta-ethylene imino propionic acid amide and beta-ethylene imino butyric acid amide. In addition, aryl or alkyl alkylene imino carbinols obtained from alkylene imines, aldehydes or ketones, such as alpha-phenyl-N-ethylene imino carbinol can be used. With the isocyanates which are to be polymerized, these compounds form addition products which are odorless and usually physiologically ineffective, this being of importance for those polymers which are to be used directly as end products.

The products thus formed by the process of this invention may include the following polymeric units:

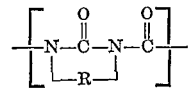

wherein R represents an organic group having at least five carbon atoms. In addition, since the polymer also contains minor amounts of free NCO groups, the polymeric product may include some of the following polymeric units:

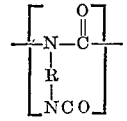

wherein R is the same as above. Moreover, it is also possible to build isocyanurate rings into the polymers.

Surprisingly, when the same catalysts are used at higher temperatures in the polymerization process the same diisocyanates are converted into trimerization products which have an isocyanurate structure. However, the polymerization products thus formed in accordance with the process of this invention differ from the products obtained in the presence of anionic catalysts at temperatures of −50° to −100° C. The products produced in this process are insoluble and have a definite melting point. In addition, they undergo a chemical change at the melting point to form isocyanurate structures. While these products are insoluble even in organic solvents, upon heating to their melting point they readily become soluble, usually oily compounds having an isocyanurate structure. Also, the products contain only a small amount of free residual NCO groups, while the conversion products formed in the melt, which have an isocyanurate structure, contain a large amount of free isocyanate groups in addition to small amounts of free monomers formed during the conversion. The products of this process can therefore be considered to be masked polyisocyanates which have very interesting applications.

Using the polymerization process of this invention, it is possible to polymerize any diisoycanate containing aliphatically connected NCO groups, and separated from each other by at least five carbon atoms. These carbon atoms may belong either to cycloaliphatic or to aromatic rings and they may also be interrupted by hetero atoms in the chain. Suitable diisocyanates are, for example, pentamethylene diisocyanate, hexamethylene diisocyanate, heptamethylene diisocyanate, octamethylene diisocyanate, dodecamethylene diisocyanate,ω,ω'-dipropyl ether-diisocyanate, thiodihexyl-diisocyanate, 3-methoxy-hexamethylene-diisocyanate, 3-butoxy-hexamethylene-diisocyanate, ω,ω'-diisocyanato-1,3,(1,)-dimethylbenzene, ω,ω'-diisocyanato-1,3-diethylbenzene, ω,ω′-diisocyanato-1,4-diethylbenzene and ω,ω′-diisocyanato-1,4-dimethyl-cyclohexane.

The quantities of catalyst to be used are highly dependent on the activity of the catalyst and the nature of the isocyanate. Reactive aromatic isocyanates, in which the isocyanate group is not sterically hindered by substituents, can be polymerized quite easily by basic ethylene imine derivatives. In general, quantities of 0.1 to about 10%, preferably from about 0.1 to about 5% by weight based on the isocyanate, produce the desired results. In cases where highly active catalysts are used, generally from about 0.1 to 1% produce the best results.

The process of this invention may be carried out in the presence or absence of solvents. If the polymerization is conducted in the presence of solvents, they should not contain any hydrogen atoms which react with the isocyanate groups. Halogenated aliphatic or aromatic hydrocarbons such as methylene chloride, chloroform, trichloroethylene, chlorinated benzene, ketones such as acetone, methyl ethylketone, diethylketone, esters such as ethyl acetate, butyl aceate, glycol monomethyl ether acetate, glycol monoethyl ether acetate, and ethers such as tetrahydrofuran and dioxane and mixtures thereof are suitable as solvents. The solvents may have a substantial effect on the progress of the polymerization as well as the catalyst.

In using the polymerization process of the invention, freshly distilled isocyanates having as small a proportion as possible of saponifiable chlorine should be used. Mixtures of isocyanates can also be subjected to the process of the invention. In some cases it may be desirable to reduce the amount of saponifiable chlorine by treating the isocyanate with basic compounds such as sodium carbonate in order to prevent an undesirable reduction in the polymerization rate.

The polymerization products of this process are generally white powders which, due to their insolubility, are precipitated when the polymerization is carried out in the presence of a solvent. If polymerization is carried out in bulk, brittle, glassy products are obtained which are easily comminuted. The polymerized products may contain a small proportion (0.2 to 1%) of detectable NCO groups. If desired, the free NCO content may be increased by dry grinding the product and thus increasing the surface area. Where the products are to be used as masked polyisocyanates, it may be advisable in such cases to mask the residual quantities of free NCO groups with phenols, malonic esters or the like in known manner.

Generally, the catalysts do not have to be inactivated by treatment with acids. Where any free monomers are present, the product may be extracted with an organic solvent to remove the free monomers, providing the polymerization was not carried out in the presence of a solvent. The yield of product obtained from the process generally ranges from about 80 to 100%, depending on the activity of the diisocyanate used.

With the polymerization of polyisocyanates, there are usually produced polyisocyanates of higher molecular weight containing one or even several isocyanurate rings and having free —NCO groups. These products are suitable, preferably with polyhydroxy compounds as co-operating components, as cross-linking agents for the manufacture of lacquers, coatings, adhesives, homogeneous or porous synthetic plastics. The coatings may be used in the preparation of coatings for wood, metal or the like.

The invention is further illustrated by the following examples in which parts are by weight unless otherwise specified.

Example 1

Approximately 500 parts of hexamethylene diisocyanate are mixed with about 5 parts by volume of β-phenyl-ethylene imine at room temperature. After approximately 1 to 2 days, it solidifies to a glassy mass which is then extracted with ethyl acetate. Approximately 10 to 20% of residual free monomeric hexamethylene diisocyanate is recovered, leaving a white powder which is insoluble in all organic solvents and melts at about 210 to about 215° C. The —NCO content of the white powder is between 0.5 and 1%.

However, when hexamethylene diisocyanate is contacted in the same manner as described above with β-phenyl-ethyl-ethylene imine and heated to 60 to 70° C., no reaction occurs.

Even when the mixture is heated for 1.5 hours at 80° C. and thereafter distilled off into a receiver heated to 50° C., no reaction occurs. Titration of the hexamethylene diisocyanate in the receiver shows a β-phenyl-ethyl-ethyleneimine content of about 0.6%. If allowed to stand for several hours at room temperature, the distillate gels and solidifies to a glassy, brittle polymer. When the product is ground, it is found to have residual free monomeric hexamethylene diisocyanate which is extracted with ethyl acetate. A white powder is recovered which is insoluble in all organic solvents and melts at a temperature of between about 210 and about 215° C. The NCO content of this material is between 0.5 and 1%. When the product is dry-ground to a particle size of about 10μ, the NCO content increases to between about 2 and 3%.

When the polymer is heated to its melting point, it is converted into hexamethylene isocyanurate, except about 10% which is recovered as monomeric hexamethylene diisocyanate. Depending on the heating time, the NCO content of the melt which has now become readily soluble is between about 22 and 24%.

The following table illustrates the conversion of the product obtained from the process of Example 1 at various temperatures in the presence of a solvent for one-half hour. The increasing occurrence of isocyanurate rings associated with an increasing content of free NCO groups was determined by titration based on the consumption of hexadecylamine in various solvents.

TABLE

| Temperature, ° C. | Solvent | Percent NCO | Solvent | Percent NCO |
|---|---|---|---|---|
| 80 | O-dichlorobenzene | 5.0 | Dimethylformamide | 8.2 |
| 110 | do | 6.6 | do | 14.7 |
| 130 | do | 7.6 | do | 16.8 |
| 150 | do | 9.6 | do | *23.6 |
| 180 | do | 14.4 | | |
| 210 | Nitrobenzene | 23.0 | | |

Example 2

(a) Approximately 100 parts of m-xylylene-diisocyanate are treated with about 2 parts N-benzyl-ethyleneimine at room temperature with agitation. The isocyanate gels after about one hour, and after an additional 4 hours a glassy, solid product is obtained which contains a small amount (5%) of free monomeric xylylene-diisocyanate. The product is worked up in accordance with the procedure described in Example 1. A white, insoluble polymer is obtained (M.P.=190 to 195°). The NCO content of the melt which is now soluble is between 20 and 22%, depending on the heating time.

(b) About 4 parts of N-butenyl-ethylene imine are added dropwise, with stirring, to a solution of 100 parts of m-xylylene-diisocyanate in about 100 parts by volume of fresh benzene at room temperature. The polymer which rapidly precipitates, is substantially free of monomeric xylylene-diisocyanate.

Example 3

Approximately 200 parts of freshly distilled heptamethylene-diisocyanate are heated with about 8 parts by volume of N-n-butyl-ethylene imine for about one hour at about 80° C. After distillation of all of the material, the distillate gels and solidifies at room temperature after standing for about 10 hours. The product is worked up in accordance with the procedure described in Example 1. An insoluble polymer is obtained in the form of a white powder (M.P.=200 to 210° C.) having a residual NCO content of between about 1 and 2%. The melt which is soluble in all organic solvents has an NCO value of between about 22 and 24%.

Example 4

About 500 parts of hexamethylene diisocyanate (0.1% saponifiable chlorine) are treated with about 10 parts of sodium carbonate at about 100° C. for about one hour. A purified hexamethylene diisocyanate is obtained which is low in saponifiable chlorine (0.02%). About 200 parts of the purified hexamethylene diisocyanate are treated at room temperature with about 4 parts of β-ethylene imine-ethyl-methyl ketone. The isocyanate gels after about 3 days. After standing for about 5 days, the contents of the flask solidifies to a hard, brittle mass. The hexamethylene diisocyanate polymer obtained is found to be identical to the product from Example 1.

Example 5

Approximately 100 parts of octamethylene diisocyanate are treated with about 5 parts by volume of β-phenyl-ethyl-ethylene imine and heated to about 100° C. for about 1.5 hours.. After distillation, polymerization occurs in about 5 days at room temperature, with the formation of a solid mass which can be worked up in accordance with the procedure described in Example 1. A white powder having a melting point of between about 210 to about 200° C. is obtained. The residual NCO content is between about 1 and 4%. The NCO content of the melt is about 16%.

Example 6

Approximately 50 parts of dodecane-diisocyanate are heated with about 4 parts by volume of N-butenyl-ethylene imine for about 1.5 hours at about 100° C. The distillate solidifies at room temperature in about a week with the formation of a solid substance which when ground and extracted in the form of a white powder melts at about 215 to about 225° C. The NCO content of the melt is about 13%.

Although th einvention has been described in considerable detail in the foregoing for the purpose of illustration, it is to be understood that such detail is solely for this purpose and that many variations can be made by those skilled in the art without departing from the spirit and scope of the invention except as set forth in the claims.

What is claimed is:

1. A method of catalyzing the polymerization of a diisocyanate to form a polymer which contains polymeric units having the formula:

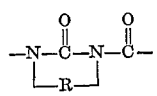

which comprises mixing at a temperature of from about 0° C. to about 50° C. (a) an organic diisocyanate having the formula:

OCN—R—NCO wherein R is an organic group having aliphatic groups connected to the —NCO groups, said —NCO groups being separated from each other by at least five carbon atombs with (b) from about 0.1% to about 10%, based on the weight of (a) of an ethylene imine having the formula:

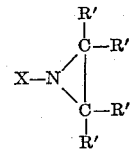

wherein X is an organic radical and R' is selected from the group consisting of hydrogen, alkyl radicals and aryl radicals.

2. The product produced by the process of claim 1.

3. The method of claim 1 wherein said ethylene imine has the formula:

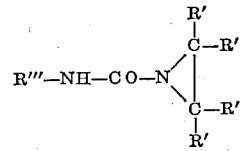

wherein R''' is obtained by removing the —NCO group from an organic monoisocyanate and R' is selected from the group consisting of hydrogen, alkyl radicals, and aryl radicals.

4. The method of claim 3 wherein said ethylene imine has the formula:

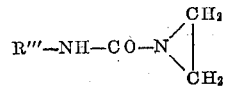

5. The method of claim 1 wherein said organic polyisocyanate is xylylene-diisocyanate.

6. The method of claim 1 wherein said ethylene imine is β-phenyl-ethyl ethylene imine.

References Cited

UNITED STATES PATENTS 3,330,828   7/1967   Grogler et al. _____ 260—248

FOREIGN PATENTS 1,401,513   4/1965   France.

DONALD E. CZAJA, Primary Examiner.

M. J. WELSH, Assistant Examiner.

U.S. Cl. X.R.

117—132, 161; 156—331